(12) United States Patent
Lasley et al.

(10) Patent No.: US 10,322,662 B2
(45) Date of Patent: Jun. 18, 2019

(54) KAYAK TRANSPORT DOLLY AND STORAGE RACK

(71) Applicants: Brent Lasley, Columbia, KY (US); Paul Carter, Columbia, KY (US)

(72) Inventors: Brent Lasley, Columbia, KY (US); Paul Carter, Columbia, KY (US)

( * ) Notice: Subject to any disclaimer, the term of this patent is extended or adjusted under 35 U.S.C. 154(b) by 0 days.

(21) Appl. No.: 15/723,705

(22) Filed: Oct. 3, 2017

(65) Prior Publication Data

US 2018/0147970 A1    May 31, 2018

Related U.S. Application Data

(60) Provisional application No. 62/403,494, filed on Oct. 3, 2016.

(51) Int. Cl.
| | |
|---|---|
| B60R 9/06 | (2006.01) |
| B60R 9/10 | (2006.01) |
| B60P 3/10 | (2006.01) |
| B63C 15/00 | (2006.01) |
| B62B 1/22 | (2006.01) |
| B63C 13/00 | (2006.01) |

(52) U.S. Cl.
CPC ............ B60P 3/10 (2013.01); B62B 1/22 (2013.01); B63C 13/00 (2013.01); B63C 15/00 (2013.01); *B62B 2202/90* (2013.01)

(58) Field of Classification Search
CPC .... B60R 9/00; B60R 9/08; B60R 9/04; B60R 9/06; B60P 3/10; B60P 3/40
See application file for complete search history.

(56) References Cited

U.S. PATENT DOCUMENTS

| | | | | | |
|---|---|---|---|---|---|
| 4,398,763 | A | * | 8/1983 | Louw ..................... | B62D 33/02 224/309 |
| 4,906,038 | A | * | 3/1990 | Morris ...................... | B60P 3/04 296/14 |
| 5,190,337 | A | * | 3/1993 | McDaniel ................. | B60P 3/42 224/405 |
| 5,228,821 | A | * | 7/1993 | Gleffe .................... | B65D 19/12 108/53.1 |
| 5,516,017 | A | * | 5/1996 | Arvidsson ............. | B60P 3/1008 224/309 |
| 5,882,170 | A | * | 3/1999 | Walton .................. | B60P 3/1033 224/402 |
| 5,957,350 | A | * | 9/1999 | Giles ........................ | B60R 9/08 224/310 |

(Continued)

*Primary Examiner* — Kimberley S Wright
(74) *Attorney, Agent, or Firm* — David W. Carrithers; Carrithers Law Office, PLLC

(57) ABSTRACT

A removable rack for holding and/or transporting kayaks with a vehicle such as a pick up, trailer, utility vehicle or flat bed truck. The rack comprises a frame which holds at least one kayaks in a pickup at a selected height and leaving storage room under rack frame. The rack also can be disassembled into a relatively small bundle of parts for easy storage and transport. The rack provides a dolly or hand truck including a frame with wheels and a handle means to maintain the desired spacing between the support surface and the kayak supported by the elevated platform. The hand truck assembly are configured to be easily moved onto an elevated platform, for example, the bed of a truck or an elevated floor such as a raised patio or deck floor. The transport device facilitates transportation of the kayak to a body of water.

18 Claims, 4 Drawing Sheets

(56) References Cited

U.S. PATENT DOCUMENTS

| | | | | |
|---|---|---|---|---|
| 6,164,507 A * | 12/2000 | Dean | | B60R 9/08 224/319 |
| 6,347,731 B1 * | 2/2002 | Burger | | B60R 9/00 224/402 |
| 6,439,646 B1 * | 8/2002 | Cornelius | | B60J 7/102 224/309 |
| 6,513,849 B2 * | 2/2003 | Carter | | B60P 3/40 224/310 |
| 6,634,689 B1 * | 10/2003 | Soto | | B60P 7/08 211/195 |
| 6,752,301 B1 * | 6/2004 | Drolet | | B60P 3/40 224/403 |
| 8,500,075 B2 * | 8/2013 | Frost | | B60P 3/1008 248/176.1 |
| 8,746,377 B1 * | 6/2014 | Dunbar | | B62B 5/0003 180/19.2 |
| 8,777,288 B2 * | 7/2014 | Johnasen | | B60P 3/00 224/324 |
| 9,156,410 B2 * | 10/2015 | Wang | | B60R 9/045 |
| 9,586,629 B2 * | 3/2017 | Leitner | | B62D 33/0207 |
| 2002/0005389 A1 * | 1/2002 | Guo | | B65D 85/185 211/85.3 |
| 2002/0163214 A1 * | 11/2002 | Carter | | B60P 3/40 296/3 |
| 2004/0108349 A1 * | 6/2004 | Child | | B62J 11/00 224/563 |
| 2004/0213654 A1 * | 10/2004 | Paxton | | B60P 3/10 414/462 |
| 2010/0072237 A1 * | 3/2010 | Green | | B60P 3/40 224/405 |
| 2010/0193555 A1 * | 8/2010 | Gift | | B60R 9/08 224/321 |
| 2011/0250042 A1 * | 10/2011 | Juarez-Ortega | | B60P 3/1025 414/559 |
| 2013/0229025 A1 * | 9/2013 | Johnasen | | B60P 3/00 296/3 |
| 2013/0257075 A1 * | 10/2013 | Riley | | B60R 9/00 296/3 |
| 2013/0319887 A1 * | 12/2013 | Symonds | | B65D 19/12 206/279 |
| 2014/0191527 A1 * | 7/2014 | Riley | | B60R 9/00 296/3 |
| 2016/0059906 A1 * | 3/2016 | Leitner | | B62D 33/0207 296/3 |
| 2017/0166105 A1 * | 6/2017 | Puchkoff | | B60R 9/06 |
| 2018/0079367 A1 * | 3/2018 | Frederick | | B60R 9/08 |

* cited by examiner

KAYAK TRANSPORT DOLLY AND STORAGE RACK

CROSS REFERENCES TO RELATED APPLICATIONS

This application claims priority from U.S. Provisional Application Ser. No. 62/403,494 filed on Oct. 3, 2016 which is incorporated by reference herein in its entirety.

TECHNICAL FIELD

The present invention relates to the field of racks conformed to fit in a pickup truck, utility vehicle or flat bed truck while providing foam rubber covered V-shaped cradles to hold and carry two kayaks and other related equipment.

BACKGROUND OF THE INVENTION

Water sports continue to grow in all areas of the world. Conventional kayak frames are stationary and designed for display of the kayak or for installation in a truck or on a trailer using fastening means such as bolts to secure the rack. Removable of the kayak frame requires tools and often is labor intensive.

Many kayaks are too large to neatly fit in the back of a van, car or pickup. It is generally desirable to tie the kayaks in place, but such vehicles are not supplied with handy or sturdy arrangements for securing kayaks and other related equipment.

Conventional frames are typically dedicated to use in a vehicle for transport or as a support frame resting on the ground. Typically kayaks are carried one at a time from the storage frame to the vehicle and strapped to the floor of the vehicle or to roof supports affixed to the roof of a vehicle. Kayaks held in the back of a pickup usually have a length extending pass the end of the truck tailgate representing a safety hazard and a transport vehicle with inadequate support.

SUMMARY OF THE INVENTION

The present invention provides for a removable rack for holding and/or transporting kayaks with a vehicle such as a pick up, trailer, utility vehicle or flat bed truck. The rack comprises a frame which holds at least one kayaks in a pickup at a selected height and leaving storage room under rack frame. The rack also can be disassembled into a relatively small bundle of parts for easy storage and transport. The rack provides a dolly or hand truck including a frame with wheels and a handle means to maintain the desired spacing between the support surface and the kayak supported by the elevated platform. The hand truck assembly are configured to be easily moved onto an elevated platform, for example, the bed of a truck or an elevated floor such as a raised patio or deck floor. The transport device facilitates transportation of the kayak to a body of water.

In accordance with the present invention, there is provided a kayak rack comprising, consisting of, or consisting essentially of a generally rectangular shaped open frame sized to fit between the fender wells of a pickup truck and inside the bed with the tail gate closed. The frame is made of a selected number of longitudinal members, for instance, twelve longitudinal members, which are removably connected together by sliding tube ends of selected longitudinal members into short tube sections rigidly connected and cooperatively engaging adjacent longitudinal members to create the box shaped frame. The frame is adjustable in height and the top of the frame is adjusted to be about slightly higher than the top of the pickup truck roof permitting a portion of the kayak to extend over the roof V-shaped brackets having a selected obtuse angle are affixed at the top four corners of the frame perpendicular to the longer portion of the frame and extend toward the sides of the truck, two at the front and two at the rear. A protective and cushioning material preferably having a high friction surface such as a foam rubber material or polymer coated material covers the V-shaped brackets. The V-shaped brackets are configured and aligned in two pairs to form two cradles capable of supporting two kayaks, one on each side of the kayak rack. It is anticipated that additional kayaks can be supported by the frame which can be modified by adding layers, or the frame could be extended in width in order to rest on a flat bed truck or trailer and hold additional kayaks side by side. The length of the kayak rack may be adjustable in order to hold kayaks having a longer or shorter length, but not a plurality of kayaks end to end.

The preferred embodiment is sized to fit into a pickup truck bed and slide in and out pivoting at over the tail gate or cargo box to rest upon wheels attached to one end of the frame providing a dolly. The top side rails include loops to apply tie downs straps which are stretched between the loops and other loops or lugs in the truck bed to rigidly fasten the frame to the truck bed. Other tie down loops are provided to hold tie down straps which hold the kayaks securely on the kayak racks.

It is an object of this invention to provide a kayak rack which fits neatly and securely in the bed of a pickup truck, utility vehicle or flat bed truck.

It is an object of this invention to provide a kayak rack which includes tie loops for tying or strapping the rack securely to conventional hook or loop tie downs which come as standard equipment in pickup truck beds typically disposed at each corner and middle or the pickup bed as well as the standard receivers along the top of the cargo box.

It is an object of this invention to provide a kayak rack which fits in the pickup bed and allows the tail gate to close securely, if desired.

It is an object of this invention to provide a kayak rack which includes padded cradles to accept and securely hold kayaks without marring or damaging the kayak shell.

It is an object of this invention to provide a kayak rack which is designed to hold the kayaks above the roof level of a pickup truck cab while leaving all of the space under the level of the roof for storage of any other desired items such a s paddles, coolers, camping equipment, and the like.

It is an object of this invention to provide a kayak rack which can be quickly and easily disassembled and stored in a relatively small area.

It is an object of this invention to provide a kayak rack which include removable wheels at the bottom to enable easy movement of the rack and the contents of the rack when the rack is on a relatively flat surface such as in a garage or basement or for forward or back movement when the rack is in the pickup truck, utility vehicle or flat bed truck and to provide a dolly when the end of the rack opposite the wheels is pickup to move the rack.

Other objects, features, and advantages of the invention will be apparent with the following detailed description taken in conjunction with the accompanying drawings showing a preferred embodiment of the invention.

BRIEF DESCRIPTION OF THE DRAWINGS

A better understanding of the present invention will be had upon reference to the following description in conjunction with the accompanying drawings in which like numerals refer to like parts throughout the views wherein.

DESCRIPTION OF THE PREFERRED EMBODIMENTS

Figure 1:
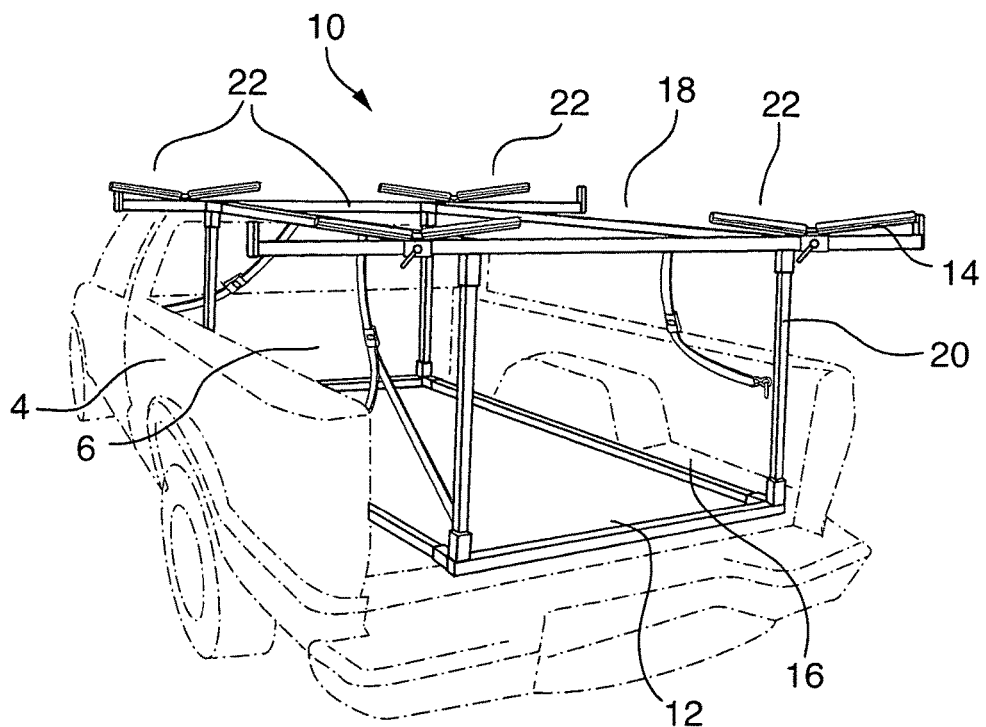
FIG. 1 is perspective rear view of the kayak rack mounted in the cargo bed of a pickup truck bed secured by ratchet straps extending from loops of the rack to the floor mounted cargo retaining rings in the front and rear corners of the cargo bed and the side standard receiver on the top of the cargo bed.

In accordance with FIGS. 1-8, there is provided a kayak rack 10 configured to be secured in a pickup truck bed, utility vehicle or flat bed truck for the purpose of supporting and transporting two kayaks. The kayak rack is a generally rectangular box shaped frame, having four corners at the bottom and four corners at the top. The box shaped rack 10 has a front side 32, a back side 34, a left side 36 and a right side 38. The rack includes four upward extending V-shaped brackets 22 upwardly extending at an obtuse angle with respect to a horizontal surface in order to cradle the rounded or angle shape of the bottom surface of a kayak. At least one bracket is disposed near each one of the top four corners. The brackets are covered with protective and/or cushioning material such as foam rubber, vinyl, tape, or other polymeric material such as closed cell foam, a polymeric coating or some other resilient material to protect the kayak bodies as they are supported by the V-shaped brackets forming two cradles. Preferably the protective/cushioning material will provide a friction enhancing surface to prevent slippage of the kayak upon the bracket. A set of paired V-shaped brackets are typically mounted to the top portion of the rack and aligned to receive two kayaks, one on each side at the top of the frame.

The kayak rack 10 includes two lower longitudinal horizontal cross members 12, two lower longitudinal horizontal side members 16, four vertical longitudinal members 20, two upper longitudinal horizontal cross members 14, and two upper longitudinal horizontal side members 18. All of the longitudinal members are tubular in construction and are preferably square or cylindrical tubing. However, other embodiments of the present invention contain round tubing rather than square. The members cooperatively engage and include corresponding sized and shaped lugs and receivers on each end providing an assembly with quick attachment members for easy assembly and disassembly.

As shown in the figures, the two lower longitudinal horizontal cross members 12 contain two short parallel tubular sections 122, one at each end, which are perpendicular to the two lower longitudinal horizontal cross members 12 and are just large enough so that the distal ends of the two lower longitudinal horizontal side members 16 form lugs can slide into distal end receivers of the lower horizontal cross members 12. The ends of the two lower longitudinal horizontal side members 16 and the four inward extending tubular sections 122 contain transverse apertures which align with one another when the ends are slipped into the tubular sections whereupon a lynch pin 30 is inserted through the aligned apertures, thus locking the joined pieces together. This assembly of two lower longitudinal horizontal cross members 12 with the two lower longitudinal horizontal side members 16 forms a rectangle which, preferably, is just narrow enough to fit between the wheel wells 8 of the pickup truck bed and just short enough to fit inside the pickup truck bed with the tail gate closed to retain the unit. It is contemplated that the rack 10 could also be used in shorter bed trucks and partially supported by the open tailgate.

The two lower longitudinal horizontal cross members 12 contain upward extending tubular sections 124 at each end which are just large enough so that the ends of the four vertical longitudinal members 20 can slide into them. The lower ends of the four vertical longitudinal members 20 and the four upward extending tubular sections 124 contain transverse apertures which align with one another when the ends are slipped into the tubular sections whereupon a lynch pin 30 is inserted through the aligned apertures, thus locking the joined pieces together.

Figure 2:
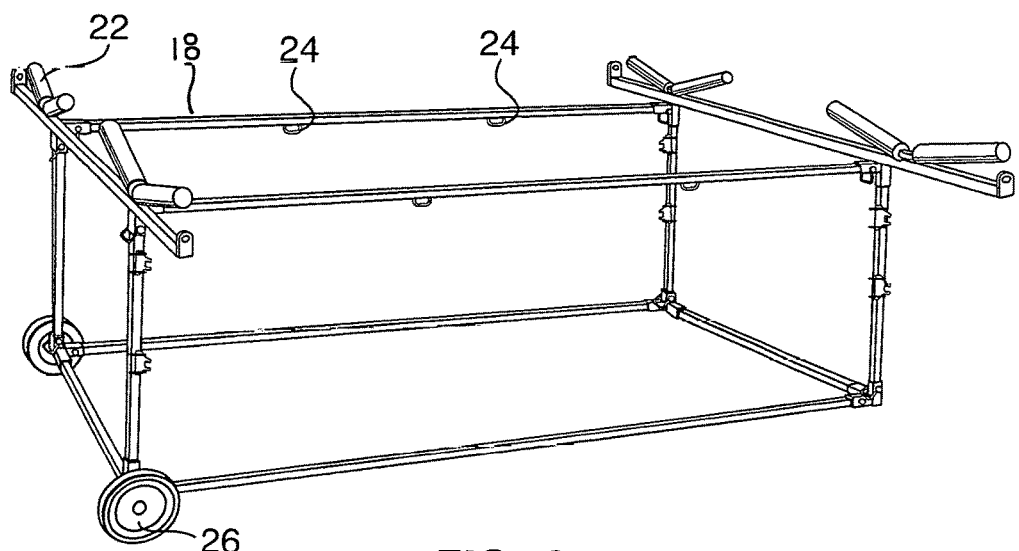
FIG. 2 is a perspective side view of the kayak rack shown resting on a flat surface with the dolly wheels attaching to the rear end of the rack sides and showing the attachment loops along the frame and v-shaped kayak support members.
Figure 3:
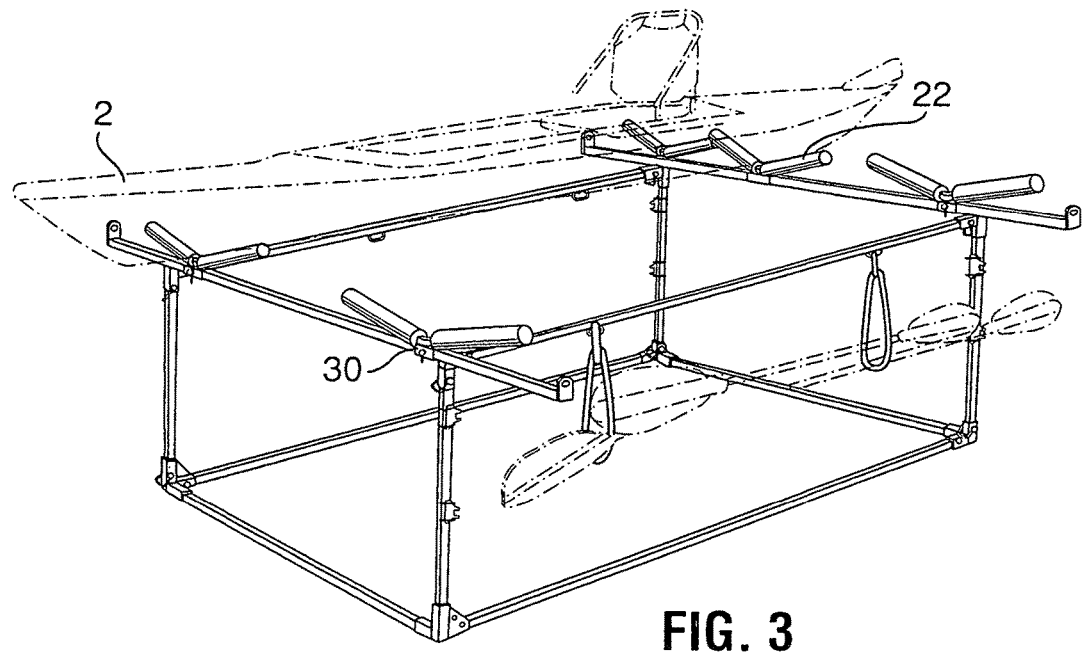
FIG. 3 is perspective view of the kayak rack supporting a kayak resting on the v-shaped support mounts.
Figure 4:
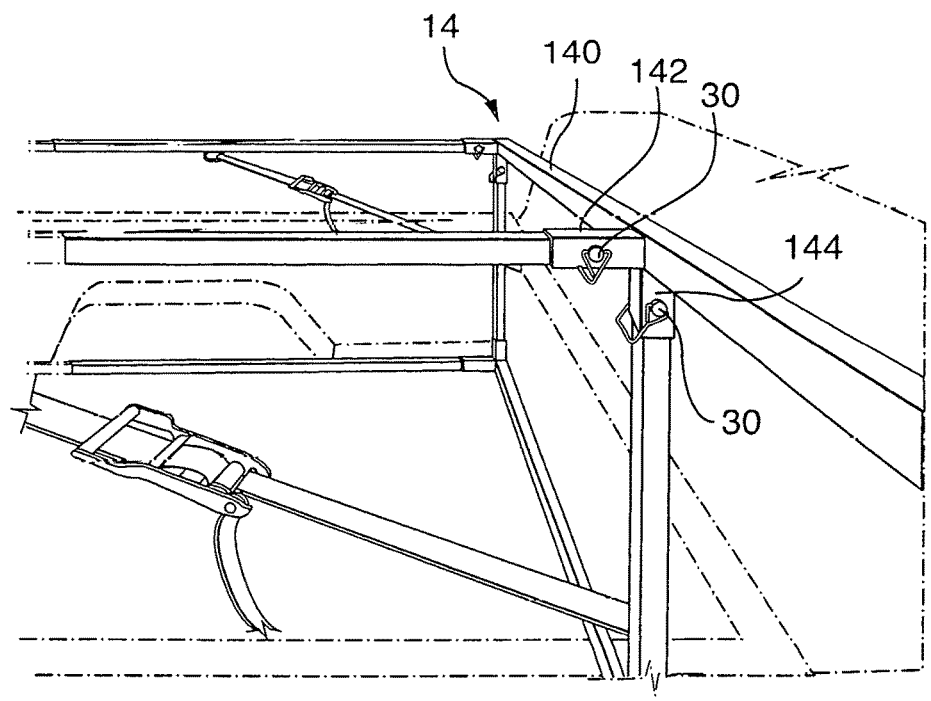
FIG. 4 is detail view of vertical and horizontal longitudinal members showing the cooperatively engaging distal ends having a lug disposed in a sleeve receiving end joined and pinned together with lynch pins for quick assembly and disassembly and showing the ratchet strap extending from the rack loop to the cargo bed retainer.
Figure 5:
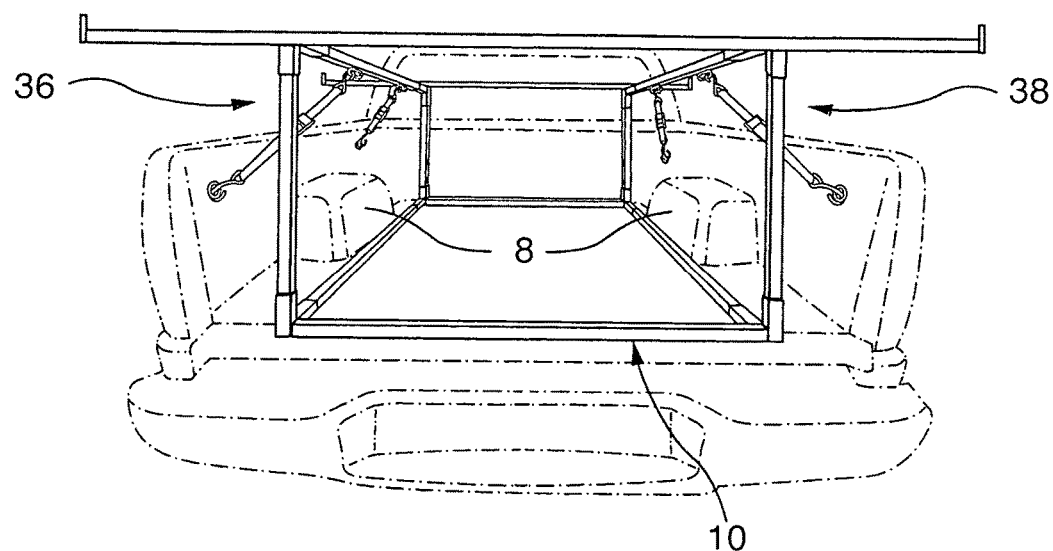
FIG. 5 is a rear view of the kayak rack secured in a pickup truck bed showing the bottom rail members of the rack nested between the fender rails of the pickup cargo rails.
Figure 6:
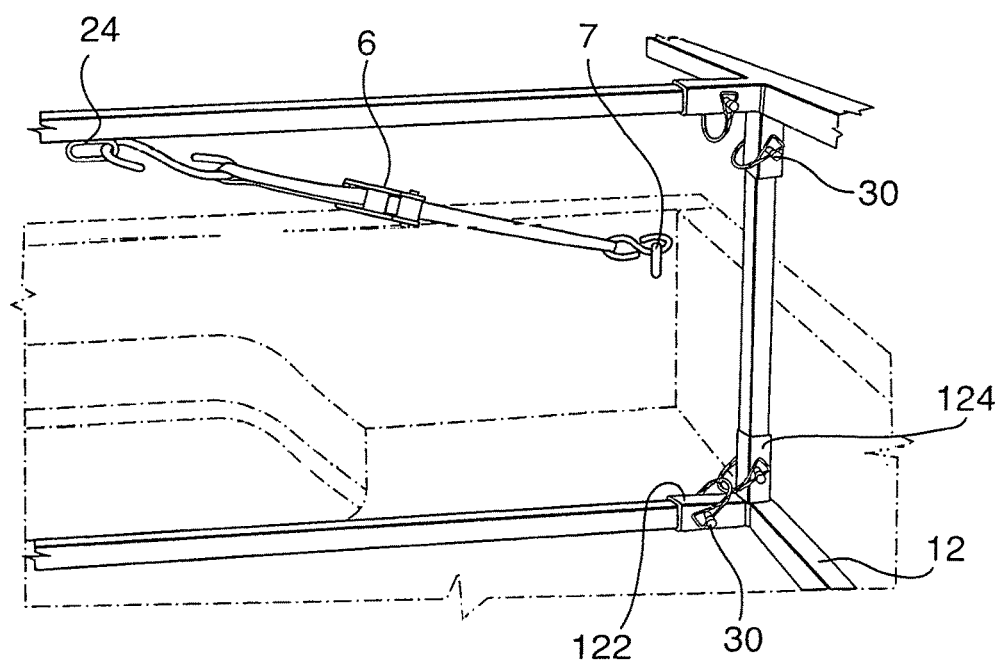
FIG. 6 is close-up view of the tie down strap installed between the tie down loop of the kayak rack and the tie down lug or retainer loop of the pickup truck bed.
Figure 7:
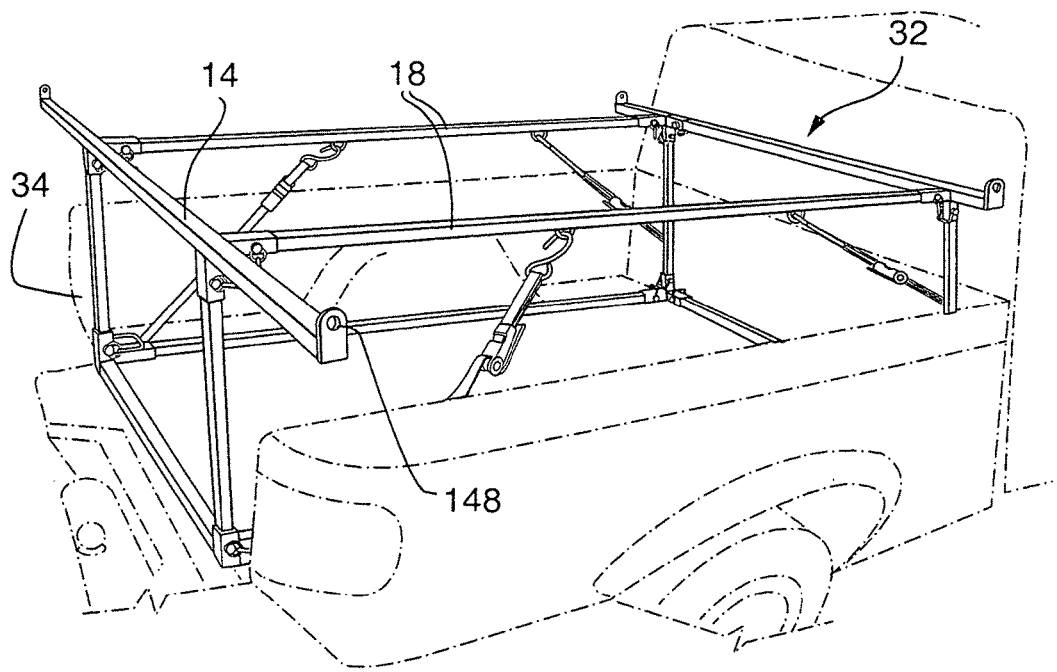
FIG. 7 is a side view of the kayak rack showing tie loops at the ends of the upper horizontal longitudinal cross members extending past the rack body.
Figure 8:
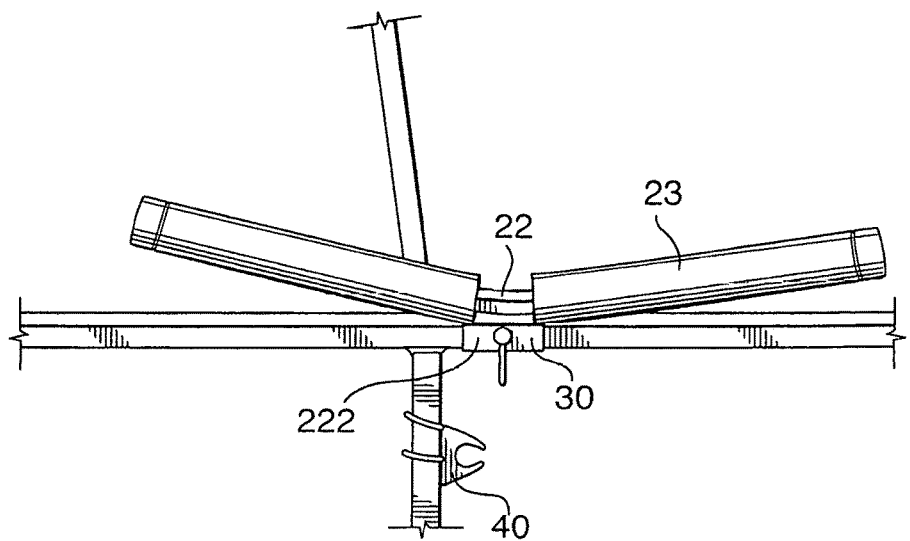
FIG. 8 is a close-up view of the V-shaped obtuse angled support bracket including a downward extending U-shaped member with attachment pin 30 such as a clip or lynch pin holding same to the rack frame.

As best shown in FIGS. 2, 6 and 7, each of the two upper longitudinal horizontal cross members 14 includes two spaced apart tubular sections 144 extending downward. The four downward extending tubular sections 144 are just large enough so that the upper ends of the four vertical longitudinal members 20 can slide there-into. The four tubular sections 144 and the ends of the upper ends of the four vertical longitudinal members 20 contain transverse apertures which align with one another when the ends are slipped into the tubular sections whereupon a lynch pin 30 is inserted through the aligned apertures, thus locking the joined pieces together. The four vertical longitudinal members 20 are long enough so that the two upper longitudinal horizontal cross members 14 rest at a height about even with the height of the pickup truck roof. One embodiment of the kayak rack has four vertical longitudinal members 20 which contain a plurality of spaced apart transverse apertures which allow for height adjustment of the kayak rack as desired.

As seen in the Figures, each of the two upper longitudinal horizontal cross members 14 includes two spaced apart tubular sections 142 extending inward toward the opposing upper longitudinal horizontal cross member 14 which are just large enough so that the ends of the two upper longitudinal horizontal side members 18 will slide into them. The tubular sections 142 and the ends of the two upper longitudinal horizontal side members 18 contain transverse apertures which align with one another when the ends are slipped into the tubular sections whereupon a lynch pin 30 is inserted through the aligned apertures, thus locking the joined pieces together.

The two upper longitudinal horizontal cross members 14 extend laterally beyond the left side 36 and the right side 38 of the box frame by about 18 inches. The ends of the two upper longitudinal horizontal cross members 14 contain loops 148 for tying the kayaks to the rack. Shallow V-shaped brackets 22 include downward extending lugs forming a U-shaped clip with apertures therein which are removably attached to the two upper longitudinal horizontal cross members 14 by lynch pins 30 passing through the apertures and apertures in the two upper longitudinal horizontal cross members 14 at a point just outside the attachment point of the downward extending tubular sections 144. The V-shaped brackets 22 are covered with protective foam rubber 23 in one preferred embodiment. The V-shaped brackets are formed having an obtuse angle of between 90 and 180 degrees and more preferably between 120 and 170 degrees, and more preferably at about 135 to 165 degrees. It is contemplated that the brackets can be an arcuate or curved shape as well so long as they serve to support the bottom and cradle the sides of the kayak.

The two upper longitudinal horizontal side members 18 have a plurality of downward extending spaced apart loops for anchoring one end of the ratchet straps tying the kayak rack tightly to the retainer loops or cargo loops mounted into the cargo bed of the pickup truck bed.

Clips 40 having C-shaped holding members extending from a base having perpendicular removable rack gripping mounts are mounted in selected areas on any of the horizontal or vertical longitudinal members for temporary snap attachment of oars and other miscellaneous items.

The wheels are removable from the rack; however, the wheels serve to support the rack for movement whereby the rack serves as a dolly which can be moved without removing the kayaks supported thereon. The kayaks are secured to the rack with elastic cords, bungee cords, tie wraps or other conventional tie means.

The foregoing detailed description is given primarily for clearness of understanding and no unnecessary limitations are to be understood therefrom, for modification will become obvious to those skilled in the art upon reading this disclosure and may be made without departing from the spirit of the invention and scope of the appended claims. Accordingly, this invention is not intended to be limited by the specific exemplification presented herein above. Rather, what is intended to be covered is within the spirit and scope of the appended claims.

We claim:

1. An integral kayak transport dolly and storage rack adapted for installation in a pick-up truck bed, comprising:
   a frame including:
   a) a pair of spaced apart aligned lower longitudinal horizontal cross members connecting to a pair of spaced apart aligned lower longitudinal horizontal side members by means of coupling;
   b) a pair of spaced apart aligned upper longitudinal horizontal cross members removably connecting to a pair of spaced apart aligned upper longitudinal horizontal side members by said means of coupling;
   c) a vertical longitudinal member extending upward from said lower longitudinal horizontal cross member and said lower longitudinal horizontal side member for joining said corresponding upper longitudinal horizontal cross member and said corresponding upper longitudinal side member; and
   d) said means of a coupling comprising a coupling member including a longitudinal sleeve segment with a medial segment interconnecting therewith extending at right angle perpendicular thereto forming a "T-shaped" coupling member having an inside diameter of a corresponding shape and a larger diameter than a co-operatively engaging distal end of said lower longitudinal horizontal cross member, said lower longitudinal side member, said upper longitudinal horizontal cross member and said upper longitudinal side member;
   said upper longitudinal horizontal cross members extending past said upper horizontal side members a selected length;
   at least one V-shaped bracket affixed to a top surface of a front upper longitudinal horizontal cross member in spaced apart parallel alignment with at least one V-shaped bracket affixed to a top surface of a rear upper longitudinal horizontal cross member, said V-shaped bracket adapter for supporting a kayak thereon; and
   retaining means for locking said coupling member to said distal end of said lower longitudinal horizontal cross member, said lower longitudinal side member, said upper longitudinal horizontal cross member and said upper longitudinal side member in a selected position.

2. The integral kayak transport dolly and storage rack, of claim 1 wherein said upper longitudinal horizontal side members include a downward extending spaced apart loop for anchoring one end of the ratchet straps tying the kayak rack tightly to a loop mounted into the cargo bed.

3. The integral kayak transport dolly and storage rack, of claim 1 further including a pair of C-shaped holding members extending from a base having perpendicular removable rack gripping mounts mounted in selected areas on a selected horizontal longitudinal member or a vertical longitudinal members for temporary snap attachment of an oar.

4. The integral kayak transport dolly and storage rack, of claim 1 further including a pair of removable wheels mounted thereto which can be removed without removing the kayaks supported thereon.

5. The integral kayak transport dolly and storage rack, of claim 1 further including tie means for securing said kayak to said rack selected from the group consisting of an elastic cord, a bungee cord, a tie wrap, and combinations thereof.

6. The integral kayak transport dolly and storage rack of claim 1 further wherein a distal end of said upper longitudinal horizontal cross member include a loop for tying a kayaks to said rack.

7. The integral kayak transport dolly and storage rack of claim 1, wherein said bracket includes a downward extending lug forming a U-shaped clip with apertures therein for removable attachment to an upper longitudinal horizontal cross member by a lynch pin.

8. The integral kayak transport dolly and storage rack of claim 1, wherein said bracket is covered with protective material selected from the group consisting of a foam rubber, a vinyl material, a tape, a polymeric coating, and combinations thereof.

9. The integral kayak transport dolly and storage rack of claim 1, wherein said bracket is formed having an obtuse angle of between 90 and 170 degrees.

10. The integral kayak transport dolly and storage rack of claim 1, wherein said bracket is formed having an obtuse angle of between 135 and 165 degrees.

11. The integral kayak transport dolly and storage rack of claim 1, wherein said bracket is formed having a curved shape.

12. The integral kayak transport dolly and storage rack of claim 1, wherein said vertical longitudinal member include a plurality of spaced apart transverse apertures for height adjustment.

13. The integral kayak transport dolly and storage rack of claim 1, wherein said retaining means is a lynch pin.

14. The integral kayak transport dolly and storage rack of claim 1, further including a plurality of apertures are formed in said lower longitudinal horizontal cross member, said lower longitudinal side member, said upper longitudinal horizontal cross member and said upper longitudinal side member for cooperative engagement with said retaining means for slidable positioning and locking said coupling member.

15. An integral kayak transport dolly and storage rack adapted for installation in a pick-up truck bed, consisting of a frame including:
 a) a pair of spaced apart aligned lower longitudinal horizontal cross members connecting to a pair of spaced apart aligned lower longitudinal horizontal side members by means of coupling;
 b) a pair of spaced apart aligned upper longitudinal horizontal cross members removably connecting to a pair of spaced apart aligned upper longitudinal horizontal side members by said means of coupling;
 c) a vertical longitudinal member extending upward from said lower longitudinal horizontal cross member and said lower longitudinal horizontal side member for joining said corresponding upper longitudinal horizontal cross member and said corresponding upper longitudinal side member; and
 d) said means of a coupling comprising a coupling member including a longitudinal sleeve segment with a medial segment interconnecting therewith extending at right angle perpendicular thereto forming a "T-shaped" coupling member having an inside diameter of a corresponding shape and a larger diameter than a cooperatively engaging distal end of said lower longitudinal horizontal cross member, said lower longitudinal side member, said upper longitudinal horizontal cross member and said upper longitudinal side member;
 said upper longitudinal horizontal cross members extending past said upper horizontal side members a selected length;
 at least one V-shaped bracket affixed to a top surface of a front upper longitudinal horizontal cross member in spaced apart parallel alignment with at least one V-shaped bracket affixed to a top surface of a rear upper longitudinal horizontal cross member, said V-shaped bracket adapter for supporting a kayak thereon; and
 retaining means for locking said coupling member to said distal end of said lower longitudinal horizontal cross member, said lower longitudinal side member, said upper longitudinal horizontal cross member and said upper longitudinal side member in a selected position.

16. The integral kayak transport dolly and storage rack, of claim 15 wherein said upper longitudinal horizontal side members include a downward extending spaced apart loop for anchoring one end of the ratchet straps tying the kayak rack tightly to a loop mounted into the cargo bed.

17. The integral kayak transport dolly and storage rack, of claim 15 further including a pair of C-shaped holding members extending from a base having perpendicular removable rack gripping mounts mounted in selected areas on a selected horizontal longitudinal member or a vertical longitudinal members for temporary snap attachment of an oar.

18. The integral kayak transport dolly and storage rack of claim 15, further including a plurality of apertures are formed in said lower longitudinal horizontal cross member, said lower longitudinal side member, said upper longitudinal horizontal cross member and said upper longitudinal side member for cooperative engagement with said retaining means for slidable positioning and locking said coupling member.

* * * * *